(12) United States Patent
Nakayama et al.

(10) Patent No.: US 8,020,309 B2
(45) Date of Patent: Sep. 20, 2011

(54) CIRCULARITY MEASURING APPARATUS

(75) Inventors: Tatsuki Nakayama, Kure (JP); Hideki Shindo, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 12/797,944

(22) Filed: Jun. 10, 2010

(65) Prior Publication Data

US 2010/0313436 A1    Dec. 16, 2010

(30) Foreign Application Priority Data

Jun. 10, 2009    (JP) ................................ 2009-139353

(51) Int. Cl.
     *G01B 5/20*      (2006.01)
(52) U.S. Cl. ........................................... 33/550; 33/543
(58) Field of Classification Search ................ 33/503, 33/542, 543, 550, 551.1, 556
See application file for complete search history.

(56) References Cited

U.S. PATENT DOCUMENTS

| | | | |
|---|---|---|---|
| 5,848,477 A * | 12/1998 | Wiedmann et al. | 33/503 |
| 5,917,181 A | 6/1999 | Yoshizumi et al. | |
| 6,484,571 B1 * | 11/2002 | Hidaka et al. | 33/503 |
| 7,765,708 B2 * | 8/2010 | Hellier | 33/503 |
| 2002/0092192 A1 * | 7/2002 | Schopf et al. | 33/556 |
| 2004/0200085 A1 * | 10/2004 | Sakata et al. | 33/550 |
| 2006/0101660 A1 * | 5/2006 | Takanashi | 33/503 |
| 2007/0205779 A1 * | 9/2007 | Carli | 324/754 |
| 2008/0021672 A1 * | 1/2008 | Powley et al. | 33/503 |

FOREIGN PATENT DOCUMENTS

| | | |
|---|---|---|
| JP | 1-259211 | 10/1989 |
| JP | 01259211 | 10/1989 |
| JP | 6-300505 | 10/1994 |
| JP | 2701141 | 10/1997 |
| JP | 2003-302218 | 10/2003 |
| JP | 2003302218 | 10/2003 |
| JP | 2004-108787 | 4/2004 |
| JP | 2004108787 | 4/2004 |
| JP | 2007-071726 | 3/2007 |
| WO | 20061008891 | 1/2006 |

* cited by examiner

*Primary Examiner* — G. Bradley Bennett
(74) *Attorney, Agent, or Firm* — Rankin, Hill & Clark LLP

(57) ABSTRACT

A circularity measuring apparatus includes: a rotary table on which a measured object is loaded; a contact-type stylus configured to contact a substantially circular measured surface of the measured object with an inclination; a holder configured to hold the stylus within a predetermined stroke range so that an inclination angle of the stylus is changeable; a displacement detector configured to detect a displacement of the inclination angle of the stylus, which is caused due to a contact between the stylus and the measured surface; and a controller configured to: estimate a position of a top end of the stylus based on an output of the displacement detector; and instruct the holder in an optimal stroke range in the position.

2 Claims, 4 Drawing Sheets

CIRCULARITY MEASURING APPARATUS

CROSS-REFERENCE TO RELATED APPLICATION(S)

This application is based upon and claims the benefit of priority from Japanese Patent Application No. 2009-139353, filed on Jun. 10, 2009, the entire contents of which are incorporated herein by reference.

BACKGROUND

1. Field of the Invention

The present invention relates to a circularity measuring apparatus and, more particularly, an improvement in a protecting mechanism of a detector with a contact type stylus.

2. Description of the Related Art

In order to collect various data about a deviation from circular form such as circularity, concentricity, coaxiality, or the like, of a measured object such as a circular column, a circular cylinder, or the like, the circularity measuring apparatus is well known. In the circularity measuring apparatus, the measured object is loaded on a rotary table, and then the rotary table is turned while detecting a surface position of a measured rotating body with a contact type stylus, or the like, so that data of surface positions of the measured rotating body are collected and thus the circularity is measured/calculated, as disclosed in JP-A-1-259211, JP-A-6-300505, JP-A-2003-302218, JP-A-2004-108787, JP-A-2007-71726, WO2006/008891 and Japanese Patent No. 2701141.

However, when a notch, especially an edged notch, or the like exists on an outer periphery of the measured object, the stylus falls into the notched portion, and the stylus is caught by an edge portion of the notch. When the rotary table continues to turn as it is, the stylus may be broken down.

Therefore, in the prior art, when the stylus comes up to the notched portion, a measuring program is suspended once, and then the stylus is fixed such that this stylus does not fall into the notched portion. Then, the stylus is caused by turning the rotary table to pass through the notched portion, and then the measuring program is started once again.

Similarly, when a measurement of an inner surface of a bore is performed, the breakage of the stylus may also be caused. More particularly, normally a holder for holding the stylus is considerably larger in diameter than the stylus. Therefore, the stylus is positioned to have an inclination such that an outer diameter portion of the holder does not contact the measured object. For this reason, a top end of the stylus is not always positioned on a center line of the holder. Upon inserting the stylus into the bore, the top end of the stylus being held obliquely is caught by an outer periphery of the bore even though the holder is positioned just over the bore, and thus the stylus may also be broken down.

Therefore, in this case, the measuring program is also suspended once upon inserting the stylus into the bore, then the stylus is fixed, then the stylus is inserted into the bore, and then the fixation of the stylus is released.

SUMMARY

The present invention has been made in view of the above prior art, and it is a subject of the present invention to provide a circularity measuring apparatus capable of performing a continuous measurement not to suspend a measuring program, upon conducting a measurement of either a measured object with a notch or an inner surface of a bore.

According to an aspect of the invention, there is provided a circularity measuring apparatus, including: a rotary table on which a measured object is loaded; a contact-type stylus configured to contact a substantially circular measured surface of the measured object with an inclination; a holder configured to hold the stylus within a predetermined stroke range so that an inclination angle of the stylus is changeable; a displacement detector configured to detect a displacement of the inclination angle of the stylus, which is caused due to a contact between the stylus and the measured surface; and a controller configured to: estimate a position of a top end of the stylus based on an output of the displacement detector; and instruct the holder in an optimal stroke range in the position.

The stylus may be formed to turn on a fulcrum. The controller may be configured to control the holder by a turning restriction of a base end portion of the stylus.

As described above, according to the circularity measuring apparatus according to the present invention, the position of the top end of the stylus is estimated based on the output of the displacement detector, and then the optimal stroke range in the position of the stylus is set. Therefore, upon conducting the circularity measurement of either the inner surface of the bore or the measured object with the notch, there is no necessity that the measuring program should be suspended and the setting of the stroke should be made manually. Also, the position of the top end of the stylus serving as the base of the setting of the stroke is grasped based on the output of the displacement detector that detects the displacement of the stylus caused due to the contact to the measured object upon conducting the circularity measurement. Therefore, other stylus position grasping means are not needed.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

One embodiment of the present invention will be explained with reference to the drawings hereinafter.

Figure 1:
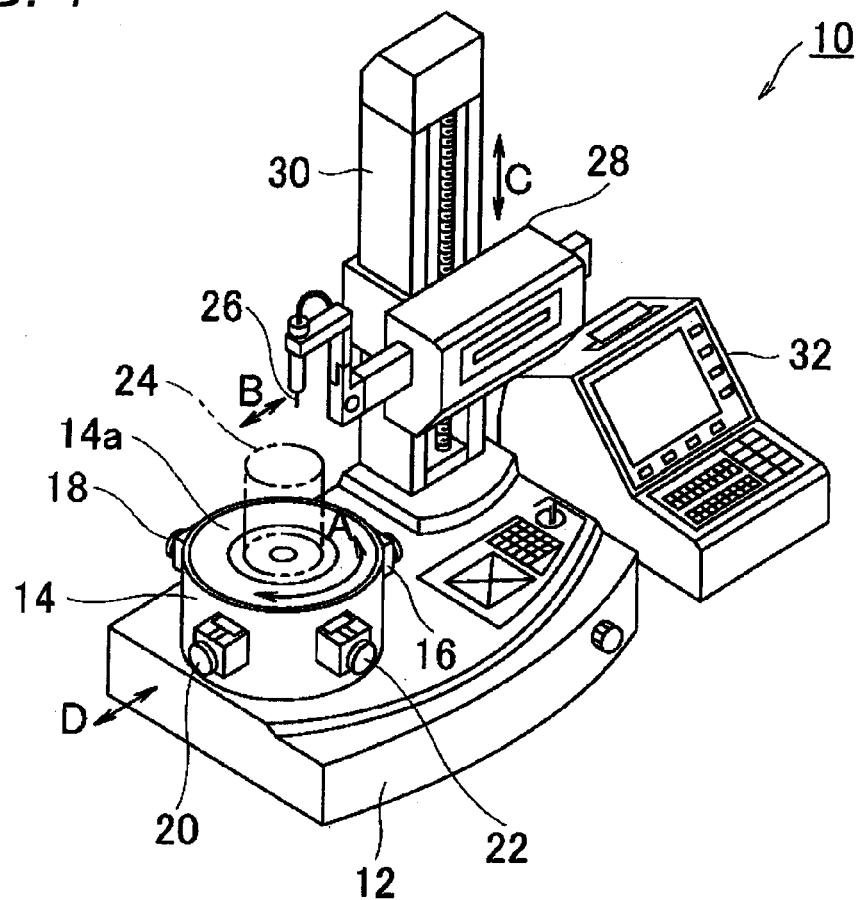
FIG. 1 is an explanatory view of a schematic configuration of a circularity measuring apparatus according to an embodiment of the present invention.

In FIG. 1, an external view of a circularity measuring apparatus according to an embodiment of the present invention is shown. In FIG. 1, a circularity measuring apparatus 10 includes a base table 12, a rotary table 14 set up rotatably on the base table 12, a position adjusting means 16 for adjusting a position in the X-direction of the rotary table 14 and a position adjusting means 18 for adjusting a position in the Y-direction of the rotary table 14, an inclination adjusting means 20 for adjusting an amount of inclination in the X-direction of a loading surface and an inclination adjusting means 22 for adjusting an amount of inclination in the Y-direction of the loading surface, a stylus 26 acting as a detector that can contact a surface of a measured object 24 loaded on the rotary table 14 and detect a position thereof, an X-axis stylus moving means 28 that causes the stylus 26 to move in the X-axis direction, and a Z-axis stylus moving means 30 that causes the stylus 26 to move in the Z-axis (vertical) direction every X-axis stylus moving means 28.

Then, an amount of rotation of the base table 12, an amount of movement on an X-Y plane of a loading surface 14a, an amount of inclination of the loading surface 14a to the X-Y plane, an amount of movement of the stylus 26 by the stylus moving means 28, 30, a displacement of inclination angle of the stylus 26 are fed to a controller 32 in which a microcomputer is built, respectively.

Figure 2:
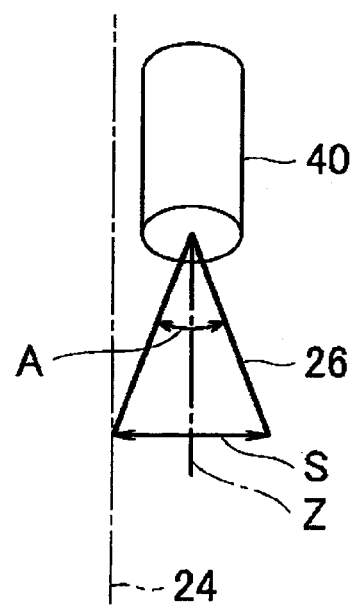
FIG. 2 is an explanatory view of an inclination angle and a stroke range of a stylus used in the apparatus shown in FIG. 1.

In the present embodiment, as shown in FIG. 2, the stylus 26 is held by a holder 40. As shown in FIG. 2, the holder 40 in which a displacement detector is built has an outer shape that is larger than the stylus 26. Therefore, there is a possibility that, when the stylus 26 is held vertically, the holder 40 comes in touch with the measured object 24 and thus the measurement by the stylus 26 is disabled.

Therefore, as shown in FIG. 2, the holder 40 holds the stylus 26 such that an inclination angle can be changed in a predetermined angle range. Also, the stylus 26 is energized by an energizing means (whose illustration is omitted) to have a maximum inclination angle. As a result, a distance from the top end of the stylus 26 to a standard perpendicular Z of the holder 40 corresponds to a movable stroke of the stylus 26 (a range in which the stylus can escape when such stylus comes into touch with the measured object).

A characterized feature of the present invention resides in that the holder 40 is informed of an optimal stroke range in the stylus position.

Figure 3:
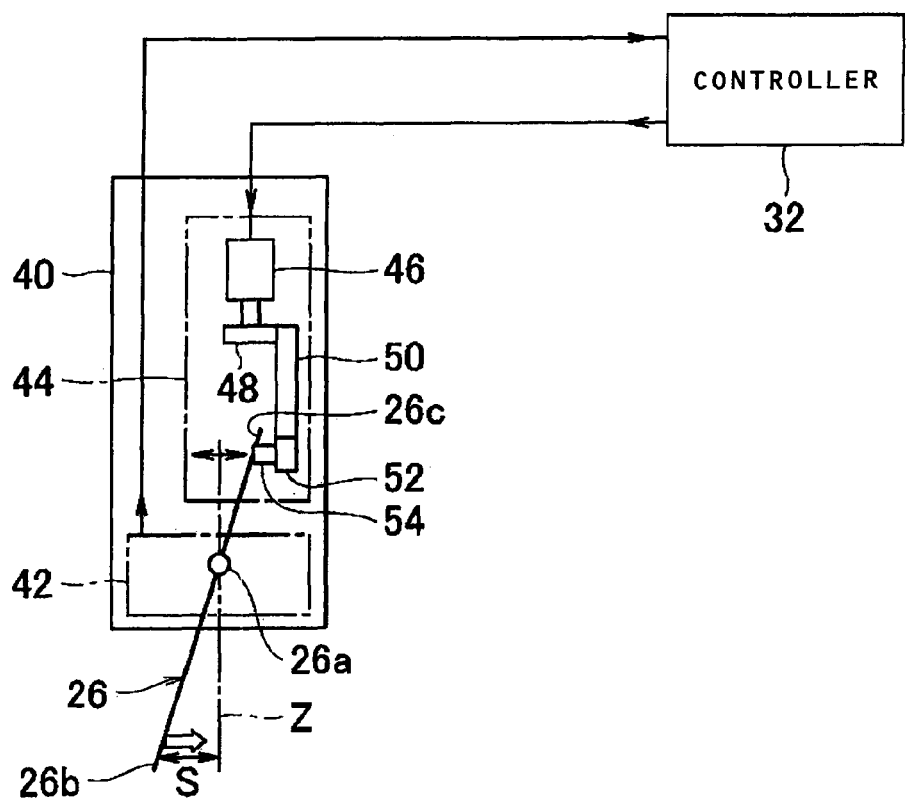
FIG. 3 is an explanatory view of a typical stylus, a holder, and a displacement detector in the present invention.

That is, as shown in FIG. 3, the holder 40 according to the present embodiment is equipped with a displacement detector 42 for detecting a displacement of the inclination angle of the stylus 26, and an inclination angle changing mechanism 44 for changing an inclination angle. Also, the inclination angle changing mechanism 44 has reduction gears 48, 50, 52, and a stroke restricting screw 54. Also, according to the rotation of a motor 46, the stroke restricting screw 54 is moved back and forth in FIG. 3 via the reduction gears 48, 50, 52. The stroke S of the stylus 26 is set short when the screw 54 goes forward, i.e., leftward, in FIG. 3, while the stroke S of the stylus 26 is set long when the screw 54 goes backward, i.e., rightward, in FIG. 3.

In the present embodiment, the lever type that can turn on a fulcrum 26a as a center of rotation is employed as the stylus 26. A top end 26b can contact the measured object. Also, a base end portion 26c contacts the restricting screw 54 to perform a turning restriction of the stylus 26, i.e., an inclination angle change and a stroke change.

Also, the setting of the stroke S is conducted by driving the motor 46 by means of the controller 32. In the present invention, the controller 32 sets the stroke S on a basis of information of an inclination angle of the displacement detector 42. That is, essentially the displacement detector 42 detects that an inclination angle of the stylus 26 that is contacting the measured object 24 is changed in accordance with a surface profile of the measured object 24. In the present invention, the displacement detector 42 is also utilized to detect an adjusted length of the stroke when a change of the stroke S (i.e., a change of the inclination angle of the stylus 26) is performed forcedly by the motor 46.

In FIGS. 4A to 4E, a state that an inner wall surface of the bore is measured by using the circularity measuring apparatus according to the present embodiment is schematically shown.

Figure 4A:
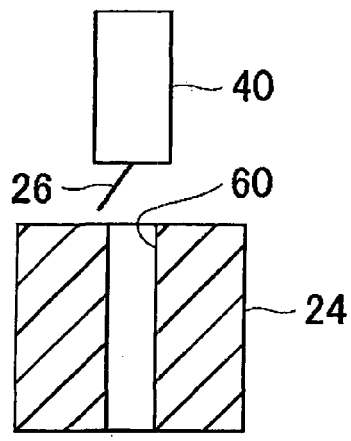
FIGS. 4A to 4E are explanatory views of a state that an inner wall surface of a bore is measured by the circularity measuring apparatus in the present invention.
Figure 4D:
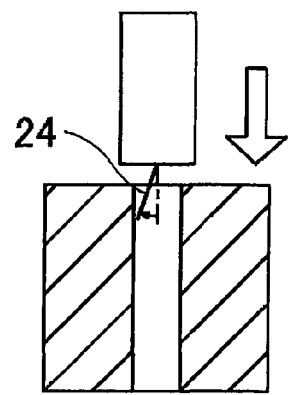
Figure 4B:
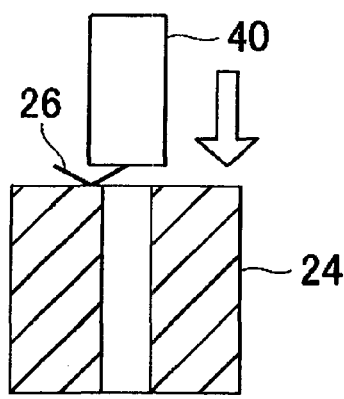

As apparent from FIG. 4A, when the stylus 26 comes near a bore 60 in a state that the stroke of the stylus 26 is kept large, the top end of the stylus 26 does not reach the bore 60 even though the holder 40 is positioned just over the bore 60. When the holder 40 is brought down as it is, the breakage of the stylus 26 is caused in some cases, as shown in FIG. 4B.

Figure 4E:
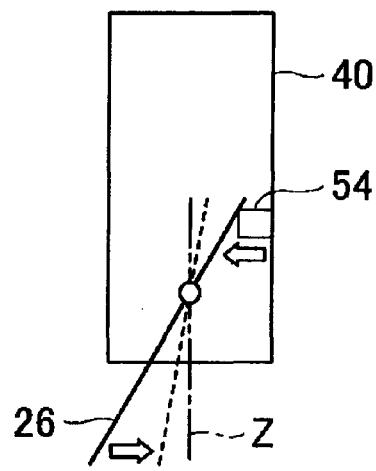
Figure 4C:
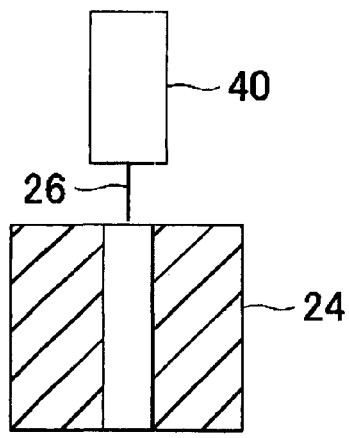

For this reason, in the present embodiment, when the holder 40 reaches the position just over the bore 60, the stroke of the stylus 26 is restricted small, as shown in FIG. 4C. As a result, the top end of the stylus 26 is contained within a range of the bore 60, and the stylus 26 comes in touch with an inner surface of the bore 60 when the stylus 26 is put down as shown in FIG. 4D, and then the stroke of the stylus 26 is slightly increased, so that the circularity measurement can be carried out.

At this time, the controller 32 estimates a position of the top end of the stylus 26, based on the measured result of the inclination angle A from the displacement detector 42. Then, the controller 32 can get a desired stroke S by adjusting an amount of extension of the stroke restricting screw 54 based on the estimated value. Then, as shown in FIG. 4E, the stroke S is made small by moving the stroke restricting screw 54 leftward, while the stroke S is made large by moving the stroke restricting screw 54 rightward.

FIGS. 5A to 5E show schematically a measuring state of the measured object with the notch on the measured surface, by using the circularity measuring apparatus according to the present embodiment.

In the present measured example, a notched portion 62 is provided on an outer peripheral surface of the cylindrical measured object 24. In the normal circularity measurement, when the stylus 26 that is energized toward the measured object comes up to the notched portion 62, the top end of the stylus 26 falls into the notched portion 62. In this state, when the rotation of the measured object 24 is still continued, the stylus 26 bumps into a wall of the notched portion 62. There are some cases where the breakage of the stylus 26 is caused as shown in FIG. 5B.

Figure 5A:
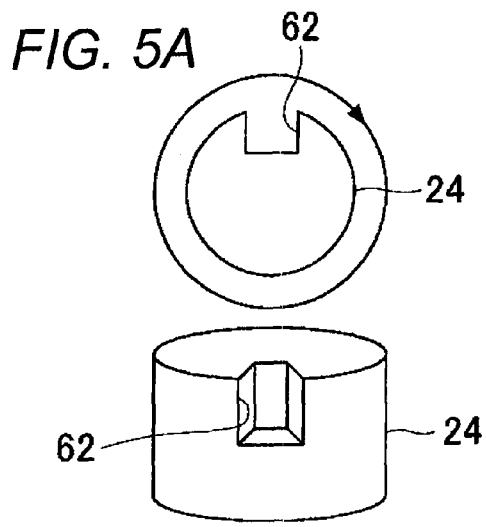
FIGS. 5A to 5E are explanatory views of a measuring state of a measured object with a notched portion by the circularity measuring apparatus in the present invention.
Figure 5E:
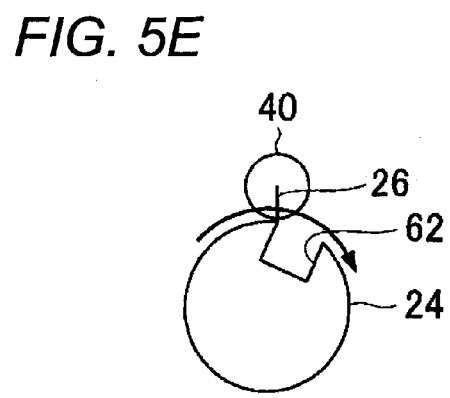
Figure 5B:
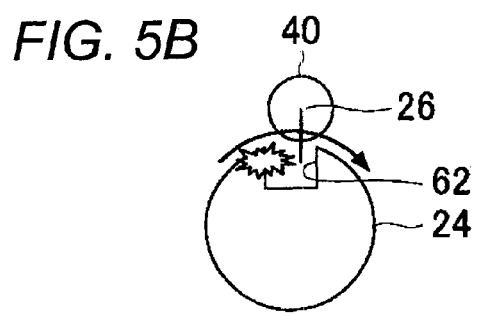
Figure 5C:
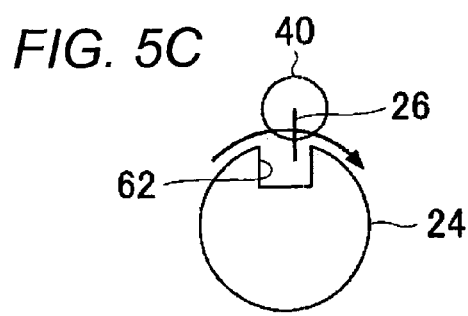
Figure 5D:
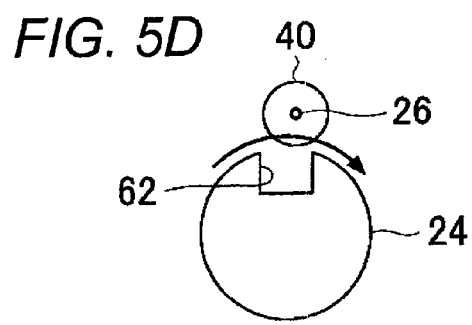

On the contrary, according to the circularity measuring apparatus of the present embodiment, when the stylus 26 comes up to the notched portion 62 as shown in FIG. 5C, the stroke S of the stylus 26 is restricted small based on the instruction from the controller 32 in such a way that the stylus 26 does not fall into the notched portion 62 as shown in FIG. 5D.

Then, the controller 32 lengthens the stroke S again immediately when the stylus 26 passes through the notched portion 62, and the circularity measurement is restarted as shown in FIG. 5E.

In the present embodiment, information of profiles of the measured object 24 is built in the measuring program previously. Therefore, when the stylus 26 is displaced in excess of a range of variation that is forecasted in the circularity measurement, the controller 32 decides that the stylus 26 comes up to the notched portion 62 and then shortens the stroke S, then lengthens the stroke S immediately when the stylus 26 passes through the notched width given by the information of profile, and then restarts the circularity measurement.

Although one embodiment according to the invention have been described above, the invention is not limited to the above-mentioned embodiment, and various design changes can be made without departing from the scope of the invention as set forth in the appended claims.

What is claimed is:

1. A circularity measuring apparatus, comprising:
   a rotary table on which a measured object is loaded;
   a contact-type stylus configured to contact a substantially circular measured surface of the measured object with an inclination;
   a holder configured to hold the stylus within a predetermined stroke range so that an inclination angle of the stylus is changeable;
   a displacement detector configured to detect a displacement of the inclination angle of the stylus, which is caused due to a contact between the stylus and the measured surface; and
   a controller configured to:
      estimate a position of a top end of the stylus based on an output of the displacement detector; and
      control the holder in an optimal stroke range in the position.

2. The circularity measuring apparatus according to claim 1, wherein:
   the stylus is configured to turn on a fulcrum; and
   the controller is configured to control the holder by a turning restriction of a base end portion of the stylus.

* * * * *